United States Patent Office 3,255,138
Patented June 7, 1966

---

3,255,138
ACRYLAMIDE DERIVATIVE HOMOPOLYMERS AND COPOLYMERS AND AQUEOUS EMULSIONS THEREOF
Winfried Kruckenberg and Gottfried Scriba, Leverkusen, Werner Langmann, Cologne-Flittard, and Karl Dinges, Cologne-Stammheim, Germany, assignors to Farbenfabriken Bayer Aktiengesellschaft, Leverkusen, Germany, a German corporation
No Drawing. Filed Dec. 27, 1961, Ser. No. 163,009
Claims priority, application Germany, Jan. 18, 1961, F 32,993
10 Claims. (Cl. 260—29.6)

This invention relates to polymers, i.e., homo- or copolymers containing reactive groups, particularly groups, which are reactive towards OH groups and basic nitrogen as well as a process for production of these polymers and copolymers. The polymers produced by the process according to the present invention possess the advantageous properties associated with polymers of similar structure but which do not contain reactive groups.

The present invention has an one of its main objects the production of homopolymers or copolymers which contain particular groups, especially acidic group, which are reactive towards OH groups and basic nitrogen containing groups.

Another object of the present invention is to prepare aqueous dispersions of such copolymers.

It is a further object of this invention to employ special monomers for production of said homopolymers or copolymers.

It is another object of this invention to apply these polymers for production of polymer films on fibrous substrates of very different types.

In accordance with the present invention, it has been discovered that polymers, i.e., homopolymers or copolymers containing groups which are reactive towards OH and basic nitrogen groups can be obtained by homopolymerization or copolymerization of monomeric compounds of the general formula $$CH_2=CR_1-X-A \qquad I$$

In said general Formula I $R_1$ represents a hydrogen atom, an aliphatic saturated hydrocarbon radical having 1 to 5 carbon atoms, a cyclohexyl or alkylcyclohexyl radical, a phenyl radical which may be substituted by alkyl or alkoxy radicals or halogen, or a halogen atom especially chlorine or bromine;
A represents a monovalent organic radical containing at least one —$OSO_3H$ group or at least one aliphatic bonded halogen atom, preferably chlorine or bromine;
X represents a divalent organic radical which activates the carbon to carbon double bond (vinylidene bond) in general Formula I, such as a member selected from the group consisting of

wherein $R_2$ indicates a hydrogen atom or a saturated alkyl radical containing from 1 to 4 carbon atoms.

More specifically in the foregoing Formula I said monovalent organic radical A containing either a —$OSO_3H$ group or a halogen atom (Hal) in most cases may be represented by the following radicals (a) —O—$SO_3H$ (i.e., the —O—$SO_3H$ group itself)
(b) —$CH_2$—$CH$—$CH_2Hal$
          |
          OH
(c) —$O(CH_2)_2Hal$
(d) —$COCH_2Hal$
(e) —$CH=CH$—$CH_2Hal$
(f) 
    —$N$—$(CH_2)_n$—$Hal$ wherein $R_2$ has the same significance as under radical X, $n=2$, 3 or 4

(g) —$N[(CH_2)_n$—$Hal]_2$, wherein $n=2$, 3 or 4
(h) —$CH_2$—$CH_2OSO_3H$
(i) —$NH$—$C_2H_4$—$OSO_3H$
(k) —$SO_2$—$NR_3$—$C_2H_4$—($OSO_3H$) or (Hal) wherein $R_3$ may indicate a hydrogen atom, a lower saturated alkyl radical (i.e., having from 1 to 4 carbon atoms) or a phenyl radical
(l) —$SO_2$—$C_2H_4$—($OSO_3H$) or (Hal)
(m) —$CONH$—$C_2H_4$($OSO_3H$) or (Hal)

It is self-evident to those skilled in the art that combination of the aforementioned radicals A with radical X must be chemically meaningful. Therefore, for example the radical:

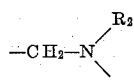

normally is combined with radicals A=$b$, $c$, $d$, $e$, $h$;
—CO—normally is combined with radicals A=$b$, $e$, $f$, $g$, $i$;
—O—normally is combined with radicals A=$b$, $d$, $e$;

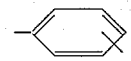

normally is combined with radicals A=$b$, $c$, $d$, $e$, $f$, $g$, $k$, $l$, $m$.

According to the preferred embodiment of the present invention the monomers according to Formula I are selected from the group consisting of:

(a) derivatives of acrylic acid amide containing an alkyl amide grouping, wherein the alkyl contains at least one —$OSO_3H$ group or at least one halogen atom;
(b) styrene sulphoamide derivatives containing in the sulphoamide grouping at least one —$OSO_3H$ or one halogen atom;
(c) derivatives of acrylic acid N-aryl amide containing in the aromatic nucleus a substituted sulphone or sulphonamide grouping, said grouping carrying a —$OSO_3H$-group or a halogen atom.

The aforesaid types of compounds which are employed as monomers according to the preferred embodiment of this invention correspond to the following formulae:

(1) Acrylamide derivatives of the general formula

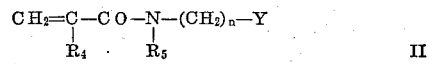

wherein $R_4$ is a member selected from the group consisting of hydrogen and methyl, Y is a member selected from the group consisting of the —$OSO_3H$ group, chloro and bromo, $n$ stands for a whole number of from 2–4 and $R_5$ is a member selected from the group consisting of hydrogen, alkyl having from 1 to 4 carbon atoms and the group —$(CH_2)_n$—$Y$ wherein Y and $n$ are as aforesaid;

(2) Styrene-sulphoamide derivatives of the general formula

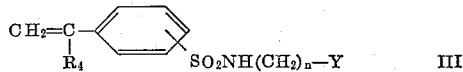

wherein $R_4$, Y as well as $n$ have the same meanings as specified under Formula II;

(3) Derivatives of acrylic acid N-aryl amide of the general formula

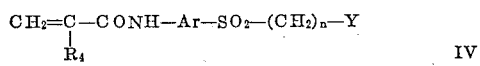
$$\text{CH}_2=\text{C}-\text{CONH}-\text{Ar}-\text{SO}_2-(\text{CH}_2)_n-\text{Y} \quad \text{IV}$$
$$\qquad\;\;|$$
$$\qquad\;\;\text{R}_4$$

wherein $R_4$, Y as well as $n$ have the same significance as specified under Formula II and Ar indicates an aromatic ring system, preferably a benzene or naphthalene nucleus which may be substituted or not;

(4) Derivatives of acrylic acid N-aryl amide of the general formula

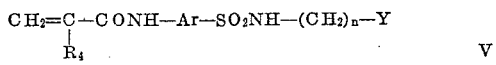
$$\text{CH}_2=\text{C}-\text{CONH}-\text{Ar}-\text{SO}_2\text{NH}-(\text{CH}_2)_n-\text{Y} \quad \text{V}$$
$$\qquad\;\;|$$
$$\qquad\;\;\text{R}_4$$

wherein $R_4$, Y as well as $n$ have the same significance as specified under Formula II and Ar indicates an aromatic ring system, preferably a benzene or naphthalene nucleus which may be substituted or not.

The aforementioned monomers may be polymerized alone or two or more of the monomers may be polymerized in admixture. The monomers may also be copolymerized with one or more other ethylenically unsaturated monomers.

Examples of suitable monomers for employment in the process according to the present invention are According to Formula II: acrylic acid di-($\beta$-chloroethyl)-amide, methacrylic acid di-($\beta$-chloroethyl)-amide, acrylic acid-($\beta$-chloroethyl)-amide, methacrylic acid-($\beta$-chloroethyl)-amide, acrylic acid-($\beta$-sulphatoethyl)-amide, and methacrylic acid-($\beta$-sulphatoethyl)-amide;

According to Formula III: styrene-($\beta$-sulphatoethyl)-sulphamide, and styrene-($\beta$-chloroethyl)-sulphamide;

According to general Formula IV: compounds of the formula

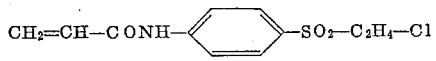

and

and according to Formula V:

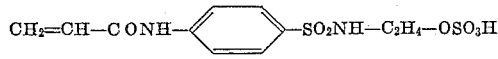

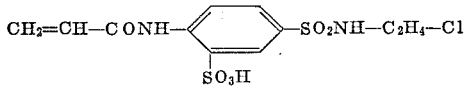

as well as the analogous methacrylic acid derivatives.

Furthermore, there are to be mentioned as suitable monomers according to general Formula I compounds such as for example chloroacetic acid allyl amide, N-allyl-N-methyl-N-$\beta$-sulphato-ethylamine, and N-allyl-N-methyl-N-$\beta$-chloroethylamine.

The aforementioned monomers may be copolymerized with one or more other ethylenically unsaturated monomers, such as (a) $\alpha,\beta$-unsaturated monocarboxylic acids and halogen derivatives thereof (e.g., acrylic, methacrylic and $\alpha$-halogenoacrylic acids); (b) amides, nitriles and esters of $\alpha,\beta$-unsaturated monocarboxylic acids, said esters containing a saturated aliphatic carbon chain of from 1 to 12 carbon atoms as for example the methyl, ethyl, propyl, butyl, n-hexyl, 2-ethylhexyl, n-octyl esters of acrylic as well as methacrylic acid; (c) $\alpha,\beta$-unsaturated dicarboxylic acids, (e.g., maleic and fumaric acids); (d) derivatives of $\alpha,\beta$-unsaturated dicarboxylic acids (e.g., esters, amides, and semi-esters); (e) vinyl ethers (e.g., vinyl methyl ether, vinyl ethyl ether and vinyl propyl ether); (f) ethers and esters of polyalkylene glycols; (g) esters of vinyl alcohol with organic acids (e.g., vinyl acetate, vinyl propionate, vinyl butyrate and vinyl stearate); (h) vinyl and vinylidene halides (e.g., vinyl bromide and vinyl chloride); (i) vinyl-sulphonic acid; (j) styrene, styrene-sulpho acids, nuclear alkylated styrenes, styrenes alkylated in the side chain and halogen derivatives of styrene; (k) compounds containing two conjugated or isolated double bonds (e.g., 1,3-butadiene, isoprene, 2,3-dimethyl butadiene, 2-chlorobutadiene, divinyl benzene and triallyl cyanurate); and (l) N-$\alpha$-pyridyl acrylamide and $\gamma$-dimethylamine-N-propyl acrylamide.

Of a preferred interest within the present invention are comonomers such as acrylic acid, methacrylic acid esters, amides or nitriles, vinyl- and vinylidene halides, styrene, as well as butadiene, isoprene and 2-chlorobutadiene.

The monomers are polymerized or copolymerized in known manner, i.e., in substances, in solution or in emulsion. Of special importance, however, is polymerization in aqueous emulsion using known redox systems as activator systems. Said aqueous polymer dispersions have a polymer content of from 10–60% by weight, preferably 30–45% by weight, besides the aqueous phase.

The monomers according to this invention may be present in the polymer or copolymer in an amount of from 1 to 100% by weight, preferably 3 to 30% by weight, based on the total weight of the monomers. The readiness for polymerization of the aforementioned monomers is naturally quite different according to whether derivatives of acrylic acid, of methacrylic acid or of allyl amine are concerned. Consequently, the maximum proportions of these monomers which can be incorporated by polymerization are likewise different in the individual cases.

Comonomers of cross-linking properties as for example divinylbenzene, triallylcyanurate, etc., should be incorporated by copolymerization in amounts not exceeding 5% by weight calculated on the total amount of monomers.

Suitable organic solvents for employment in the process according to the present invention when the polymerization is carried out in solution are (a) aliphatic alcohols (e.g., methanol, ethanol, n-propanol and n-butanol); (b) aromatic hydrocarbons (e.g., benzene, toluene and xylene); (c) halogenated hydrocarbons (e.g., chloroform, trichloroethylene, dichloroethylene and chlorobenzene). Water or mixtures of water and low molecular weight aliphatic alcohols may be of practical interest if monomers are employed which show at least a substantial solubility in water.

Suitable activators or activator systems are (a) inorganic peroxy compounds (e.g., alkali metal persulphates such as potassium persulphate, ammonium persulphate and perborates, percarbonates and perphosphates); (b) organic peroxy compounds (e.g., diacyl peroxides such as benzoyl peroxide, alkyl hydroperoxides such as tert. butyl hydroperoxide, cumene hydroperoxide, p-methane hydroperoxide and dialkyl peroxides such as di-tert.-butyl peroxide); (c) azo compounds such as azo diisobutyric acid dinitrile; (d) Redox systems consisting of an inorganic peroxy compound and a reducing agent, such as alkali metal pyrosulphites, bisulphites or thiosulphates, when working in an acid medium, or reducing agents such as triethanolamine and diethylene triamine, when the polymerization is carried out in an alkaline medium. Formaldehyde sulphoxylate and formamidine sulphinic acid in combination with heavy metal ions, such as iron and copper and if desired, a complex former, such as a pyrophosphate or ethylene diamine tetra-acetic acid, may also be employed as reducing agents.

The quantity of activator or activator system employed may be varied within wide limits. The activator or activator system is, however, preferably employed in an amount of from 0.1% to 2% by weight, based on the weight of the monomers. It is possible to use cationic, anionic and non-ionic emulsifiers when the polymerization is carried out in aqueous emulsion. Examples of suitable ionic emulsifiers are (a) long-chain alkyl sulphates and alkyl sulphonates preferably containing from 12 to 20 carbon atoms in the molecule; (b) salts of alkylaryl sulphonic acids; (c) salts of long-chain monocarboxylic acids preferably containing from 10 to 12 carbon atoms in the molecule; (d) salts of sulphonates oils, (e) salts of fatty acid condensation products with hydroxyalkyl carboxylic acids and with amino alkyl carboxylic acids and (f) alkylated benzene-sulphonic and naphthalene-sulphonic acids. Suitable non-ionic emulsifiers are (a) reaction products of ethylene oxide with phenols, preferably containing more than 10 ethylene oxide units (e.g., ethoxylated nonylphenols); (b) reaction products of an alkylene oxide with a fatty alcohol (e.g., ethoxylated oleyl alcohol and ethoxylated decyl alcohol) and (c) sugar esters and ethers of sugar alcohols. The quantity of ion-active emulsifiers employed will generally not exceed 5% by weight, based on the total weight of the monomers. The particular emulsifier employed in any given case will depend on the nature of the monomer(s) to be polymerized. The content of emulsifier is generally in the range from 0% to 20% by weight and preferably in the range from 0% to 5% by weight.

The polymerization may be carried out intermittently by first of all emulsifying the monomers in an aqueous emulsifier solution and then initiating the polymerization by adding the activator. However, the polymerization may also be carried out in a semicontinuous or in a completely continuous manner. Thus, a portion of the reactants may be initially introduced into the reaction vessel and the remaining quantities of the reactants added during the reaction. Alternatively all the reactants may be continuously supplied to the reaction vessel provided with suitable stirrer assemblies and the resulting latex constantly discharged therefrom. The polymerization temperature should be from 5° C. to 80° C. and preferably from 20° C. to 40° C. The pH value of the reaction medium may be from 2 to 9, but is preferably from 3 to 6. It will be obvious that high temperatures within the aforementioned ranges are not employed simultaneously with high pH values.

It is extremely surprising and contrary to what would be expected that no cross-linking reactions, for example, occur when carrying out the process according to the present invention, i.e., when polymerizing monomers which, in addition to the polymerization carbon-to-carbon double bonds, carry a plurality of reactive groups.

The homopolymers and copolymers obtained by the process according to the present invention, especially the latices obtained by emulsion polymerization, surprisingly exhibit the property of being able to form polymer films on fiber substrata of very different types, for example on textiles, leather, fiber fleeces and paper. These polymer films have an excellent fastness to washing, a high resistance to rubbing and also a high degree of resistance to solvents.

Furthermore, homopolymers as well as copolymers according to this invention are suitable for production of coatings on different materials such as wood, metal, etc., and may be used as stoving lacquers.

Solid copolymers can also be obtained by the process according to the present invention. These solid copolymers show unexpectedly desirable properties because they contain a large number of groups capable of being cross-linked. In particular they exhibit improved heat-resistance and reduced swelling capacity in organic solvents and also an improved dyeing capacity.

Fixation of the latices on the fiber substrata can be effected by merely raising the temperature, for which purpose temperatures of from 40° C. to 160° C. and preferably from 130° C. to 140° C. are suitable. On the other hand fixation of the latices can be effected by contemporary employment of acid-binding agents, such as alkali metal hydroxides, carbonates and acetates and alkali metal salts of weak acids, such as alkali metal phosphates and borates (buffering agents). The acid-binding agents are generally employed in an amount of from 0.8 to 1.5 equivalents per equivalent of acid to be split off, although larger or smaller amounts can be used in certain cases. The acid-binding agents are generally added to the latex before it is applied to the support, for example textile material.

The latices may be applied to a support by any conventional applicator assembly, for example by passing the latices between rollers and subsequently wringing them until they show an increase in weight in the wet state of from 80% to 100%.

The treated textile material is heated, either immediately after drying or in a separate operation, to effect setting of the latices on the textile material. The duration of this heat treatment depends on the nature of the polymers but is generally from 5 to 20 minutes.

Crease-resistant finishes or other textile finishes can be applied in the same working operation, provided this is possible under identical working conditions.

The polymers produced by the process according to the present invention, especially the polymer latices, are suitable for the finishing of fiber substrata, such as woven fabrics of natural fibers (cellulose), such as wool (silk), cotton, jute or regenerated cellulose and also synthetic fibers, such as those based on polyamides (polycaprolactam) or polyurethanes, polyesters, polyacrylonitrile as well as fiber fleeces of these materials, and furthermore paper and leather.

Polymer latices according to this invention which contain water-solubilising groups in the polymer molecule show particularly high mechanical stability and therefore represent particularly useful products. Examples of such polymer latices contain copolymers of monomers of the aforementioned general Formula I as well as monomers containing water-solubilising groups. These latter monomers should be incorporated in said copolymers in an amount of about up to 20% by weight calculated on the total amount of monomers. By water-solubilising groups are understood, for instance, the —COOH, —CONH$_2$, —SO$_3$H as well as —SO$_2$NH$_2$ groups. By way of example as water-solubilising group-containing monomers are mentioned styrene-sulphonic acid, sulphanilic acid acrylamide, acrylamide, vinyl-sulphonic acid as well as acrylic and methacrylic acids themselves. Or this said water-solubilising groups may be contained in the monomers according to the general Formulae I and II to V.

With preponderant use of emulsifiers having a non-ionic character, i.e., the use of a maximum of 5% of ionic emulsifiers, based on the total amount of monomers, latices having a very high mechanical stability and re-emulsifiable latices can thus be obtained. The degree of stability of the latex or its re-emulsifiability may be regulated by suitably increasing the proportion of water-solubilising comonomer. It is particularly surprising that there are thus obtained latices which can be re-emulsified even after being dried at temperatures up to 60° C. and which, after condensation at high temperatures, form films on textile materials which are extremely fast to washing.

The polymers and copolymers produced by the process according to the present invention are especially suitable for the finishing of textiles, i.e., for improving the "feel," the resistance to scouring and the fastness to wet rubbing. They are also useful for making various fiber substrata water-repellent. The finishes thus obtained are very resistant to solvents. Other properties of the treated textiles may also be modified by suitable choice of the monomers, the molecular weight of the polymers and of the emulsifiers.

In order that the invention may be more clearly understood the following examples, in which all parts are by weight unless otherwise stated, are given by way of illustration only:

*Example 1*

100 parts of acrylic acid-($\beta$-sulphatoethyl)-amide were dissolved in 900 parts of water. Polymerization was initiated by the addition of 0.5 part of sodium formaldehyde sulphoxylate and 0.5 part of ammonium persulphate at 40° C. A clear viscous solution was obtained. 22.5 parts of caustic soda in the form of a 5% sodium hydroxide solution were added to the clear viscous solution. The resulting alkali solution was applied to stape rayon by a Foulard process. The applied solution was dried and condensed for 5 minutes at 140° C. The staple rayon thus treated had a "full" soft feel and showed excellent resistance to scouring. These properties were retained after washing the staple rayon several times in boiling water.

A product showing similar properties may be obtained if instead of acrylic acid-(-β-sulphatoethyl)-amide in the foregoing example compounds of the formula

or

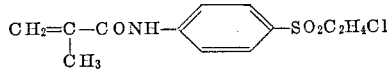

were used.

Example 2

40 parts of butadiene, 41 parts of styrene, 15 parts of acrylonitrile and 4 parts of acrylic acid-(-β-sulphatoethyl)-amide were emulsified in a solution of 10 parts of the ethoxylation product of dodecyl alcohol with 20 mols of ethylene oxide in 100 parts of water. Polymerization was initiated by activation wth 0.8 part of hexadecyl sulphinic acid at 25° C. A latex having a polymer content of 47% was thus obtained. 1.25 parts of 2,2'-dihydroxy-3,3'-dicyclohexyl-5,5'-dimethyl diphenyl methane were added as antioxidant and the residual monomers were removed by treatment with steam.

The resulting latex was diluted with twice the quantity of water and applied by means of rollers to a cotton or staple rayon which had previously been treated with a 2.5% sodium hydroxide solution. The material was then dried and thereafter heated for 5 minutes at 140° C. A finished fabric having a pleasing feel and improved resistance to scouring was thus obtained.

Scouring test (using the "Repenning"-apparatus):

(a) finished fabric: 1500 cycles
(b) finished fabric as under (a) after one boiling-wash: 1300 cycles
(c) finished fabric as under (a) after five boiling-washes: 1300 cycles
(d) untreated fabric: 600 cycles Boiling-wash: treating the fabric for 20 minutes at 100° C. in a solution of 1 gram per liter of Marseilles soap and 3 grams per liter of soda.

Example 3

Butylacrylate, styrene and methacrylic acid-(β-sulphatoethyl)-amide were emulsified or dissolved according to the following table in a solution of 5 parts of sodium dodecyl sulphate in 180 parts of water.

| | a | b | c | d | e | f | g | h | i | k |
|---|---|---|---|---|---|---|---|---|---|---|
| Butyl acrylate | 60 | 60 | 60 | 60 | 55 | 50 | 50 | 45 | 40 | 35 |
| Styrene | 40 | 35 | 30 | 25 | 25 | 25 | 20 | 15 | 10 | 5 |
| Methacrylic acid-(β-sulphatoethyl)-amide | | 5 | 10 | 15 | 20 | 25 | 30 | 40 | 50 | 60 |

The resulting suspensions were polymerized by adding 0.8 part of sodium pyrosulphite and 0.4 part of potassium persulphate at 50° C. The mechanical stability of the resulting latices increased with increasing content of the methacrylic acid - (β - sulphatoethyl) - amide component. The combination indicated under (a), without this comonomer, shows a quite moderate stability, whereas from experiment (d) (15% of this comonomer), a capacity for re-emulsification is provided.

These latices can be fixed in similar manner (as described in Example 2) on cotton or staple rayon. Another method follows below. In each case, the finished fabric shows an improved resistance to scouring, whereas the nature of the feel is changed with the ratio of the monomers introduced.

A stable rayon fabric was impregnated with the following aqueous solution:

180 parts of latex according to Example 3(a)
5 parts of ammonium sulphate
180 parts of a 50 percent (by weight) solution of dimethylol-urea
935 parts of water After drying at 100° C. condensation was effected by heating over a period of 4 minutes to 135° C.

Scouring test (using the "Repenning"-apparatus):

(a) finished fabric: 38° cycles
(b) fabric treated merely with dimethylol urea: 130 cycles
(c) untreated fabric: 170 cycles The wrinkle recovery of the fabric finished as described before was the same as that one obtained with a fabric which was treated only with dimethylol urea.

Example 4

0.1 part of hydrogen peroxide and 0.2 part of formic acid were added to a solution of 5 parts of homopolymer of methacrylic acid-(β-sulphatoethyl)-amide in 100 parts of water. A solution of 0.2 part of benzoyl peroxide in 85 parts of vinyl acetate and 15 parts of methacrylic acid-(β-sulphatoethyl)-amide was continously run in at 60° C. A latex with a polymer content of 46% was thus obtained. The latex could be re-emulsified and produced a wash-fast finish on cotton after alkali condensation (similar to the process described in Example 2).

A cotton fabric was treated with the following aqueous solution (by padding):

100 parts of latex according to example 4
100 parts of dimethylol-ethylene-urea (reactant-resin)
10 parts of magnesium chloride
790 parts of water After drying at 100° C. condensation was effected by heating for 4 minutes to 150° C.

Scouring test (using the "Repenning"-apparatus):

(a) finished fabric: 430 cycles
(b) fabric treated merely with dimethylol-ethylene-urea: 180 cycles
(c) untreated fabric: 200 cycles

Example 5

20 parts of acrylonitrile, 60 parts of styrene and 20 parts of methacrylic acid-(β-sulphatoethyl)-amide were dissolved or emulsified in a solution of 5 parts of sodium dodecyl sulphate in 180 parts of water. Polymerization was initiated by the addition of 0.3 part of potassium persulphate and 0.6 part of sodium pyrosulphite. A latex which could be re-emulsified was thus obtained. The latex had a polymer content of 39.0%.

Example 6

23 liters of salt-free water, 27 grams of sodium acetate, 45 cc. of 80% phosphoric acid and 5.4 mg. of $CuSO_4 \cdot 5H_2O$ were introduced into a 40-liter vessel which was provided with a stirrer mechanism, thermometer connection and inlet pipe. The solution was heated to 45° C. 24 grams of potassium persulphate and 48 grams of sodium pyrosulphite were then added and the introduction of a monomer mixture of 4750 grams of acrylonitrile and 200 grams of methyl acrylate was commenced. A solution of 50 grams of the compound $$CH_2=CH-CO-NH-CH_2-CH_2-O-SO_3H$$

in 1000 grams of water was run in simultaneously with the monomer mixture. The supply of the monomers was so regulated that the total quality of the monomers had been introduced at the end of 4½ hours. A solution of 7.3 grams of potassium persulphate in 2000 cc. of water was added after 1½ hours and a solution of 14.6 grams of sodium pyrosulphite in 2000 cc. of water after 3 hours.

After completing the introduction of the monomers, the mixture was stirred for 30 minutes at 45° C., thereafter filtered off and dried at 40° C.

A pure white polymer having a K value of 90.0 was thus obtained in a yield of 92% of the theoretical.

Example 7

A solution of 5 parts of an ethoxylation product of oleyl alcohol and 20 mols of ethylene oxide and 1 part of sodium pyrosulphite in 170 parts of water were introduced into a reaction vessel at 45° C., in a semi-continuous working method, together with a mixture of 50 parts of butyl acrylate, 30 parts of styrene and 20 parts of N-methyl-N-β-chloroethyl-α-methyl acrylamide and a solution of 0.5 part of potassium persulphate in 10 parts of water. The rate at which these reactants were introduced into the reaction vessel was so regulated that the monomers introduced polymerized immediately and no excess of unreacted monomers was formed. A latex having a polymer content of 35% was thus obtained.

The latex thus obtained was very suitable for use as a textile finishing, for the printing or padding of textiles and also for the treatment of leather.

Example 8

A monomer mixture of 50 parts of butyl acrylate, 30 parts of styrene and 20 parts of N-methyl-N-β-bromethyl-α-methyl-acrylamide was polymerized to a latex having a polymer content of 32%, employing the procedure described in Example 7. The bromine thus incorporated into the polymer was particularly reactive and consequently was suitable for fixation of the polymer film on the fiber in a manner resistant to washing and rubbing.

Example 9

Another latex having reactive groups incorporated therein was prepared as follows:

5 parts of sodium dodecyl sulphate were dissolved in 180 parts of water. 55 parts of butyl acrylate, 30 parts of styrene, 10 parts of styrene-(β-sulphatoethyl-sulphamide and 5 parts of N-α-methyl acryloyl sulphanilic acid were emulsified in the resulting solution. Polymerization was initiated at 50° C. by adding 0.8 part of sodium pyrosulphite and 0.4 part of potassium persulphate. A very stable latex having a polymer content of 33% was thus obtained.

A latex of similar properties can be obtained if in the foregoing example styrene-(β-sulphatoethyl)-sulphamide is replaced by the same quantity of styrene-(β-sulphatoethyl) carbonic acid amide.

Example 10

55 parts of butyl acrylate, 25 parts of styrene and 20 parts of N-di-(β-sulphatoethyl)-α-methyl acrylamide were emulsified in a solution of 5 parts of sodium dodecyl sulphate in 180 parts of water. Polymerization of the resulting emulsion was initiated by running in a solution of 0.2 part of tert.-butyl hydroperoxide and a solution of 0.2 part of sodium formaldehyde sulphoxylate. A very stable latex having a polymer content of 32.5% was thus obtained.

What we claim is:

1. a composition useful for finishing fiber substrates, printing and dyeing purposes comprising a polymer of a monomer of the formula:

$$CH_2=CR_1-X-A$$

wherein $R_1$ is a member selected from the group consisting of hydrogen, alkyl having 1 to 5 carbon atoms, cyclohexyl, alkylcyclohexyl, phenyl, alkylphenyl, alkoxyphenyl, halophenyl, bromo and chloro, A is a monovalent organic radical containing at least one member selected from the group consisting of —$OSO_3H$, aliphatically bonded chlorine, and aliphatically bonded bromine, and X is a divalent organic radical selected from the group consisting of

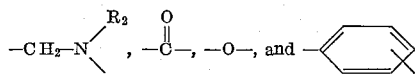

wherein $R_2$ is a member selected from the group consisting of hydrogen and alkyl having from 1 to 4 carbon atoms.

2. A composition useful for finishing fiber substrates, printing and dyeing purposes which comprises a copolymer of (1) 3–30% by weight, based on the total weight of monomers, of a monomer of the formula:

$$CH_2=CR_1-X-A$$

wherein $R_1$ is a member selected from the group consisting of hydrogen, alkyl having 1 to 5 carbon atoms, cyclohexyl, alkylcyclohexyl, phenyl, alkylphenyl, alkoxyphenyl, halophenyl, bromo and chloro, A is a monovalent organic radical containing at least one member selected from the group consisting of —$OSO_3H$, aliphatically bonded chlorine, and aliphatically bonded bromine, and X is a divalent organic radical selected from the group consisting of:

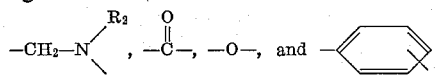

wherein $R_2$ is a member selected from the group consisting of hydrogen and alkyl having from 1 to 4 carbon atoms and (2) an ethylenically unsaturated monomer selected from the group consisting of alpha, beta-unsaturated monocarboxylic acids and their derivatives; amides, nitriles and esters of alpha, beta-unsaturated monocarboxylic acids; alpha, beta-unsaturated dicarboxylic acids and their derivatives; vinyl ethers; ethers and esters of polyalkylene glycols; esters of vinyl alcohol; vinyl halides and vinylidene halides; vinyl sulfonic acid; styrene and its derivatives, and conjugated diolefins.

3. A composition useful for finshing fiber substrates, printing and dyeing purposes which comprises a polymer of a monomer of the formula:

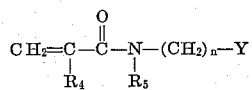

wherein $R_4$ is a member selected from the group consisting of hydrogen and methyl, Y is a member selected from the group consisting of the —$OSO_3H$ group, chloro and bromo, $n$ stands for a whole number of from 2 to 4 and $R_5$ is a member selected from the group consisting of hydrogen, alkyl having from 1 to 4 carbon atoms, and the group —$(CH_2)_n$—Y wherein Y and $n$ are as aforesaid.

4. The composition set forth in claim 3 wherein the said monomer is acrylic acid-(beta-sulphatoethyl)amide.

5. The composition set forth in claim 3 wherein the said monomer is methacrylic acid-(N-methyl-N-betachloroethyl)-amide.

6. The composition set forth in claim 3 wherein the said monomer is methacrylic acid-N-methyl-N-beta-bromoethyl amide.

7. The composition set forth in claim 3 wherein the said monomer is methacrylic acid-N-di-(beta-sulphatoethyl)-amide.

8. A composition useful for finishing fiber substrates, printing and dyeing purposes comprising an aqueous emulsion of a polymer of a monomer of the formula:

$$CH_2=CR_1-X-A$$

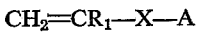

wherein $R_1$ is a member selected from the group consisting of hydrogen, alkyl having 1 to 5 carbon atoms, cyclohexyl, alkylcyclohexyl, phenyl, alkylphenyl, alkoxyphenyl, halophenyl, bromo and chloro, A is a monovalent organic radical containing at least one member selected from the group consisting of —$OSO_3H$, aliphatically bonded chlorine, and aliphatically bonded bromine, and X is a divalent organic radical selected from the group consisting of:

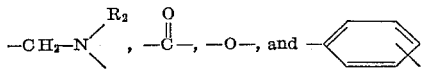

wherein $R_2$ is a member selected from the group consisting of hydrogen and alkyl having from 1 to 4 carbon atoms.

9. A composition useful for finishing fiber substrates, printing and dyeing purposes which comprises an aqueous emulsion of a copolymer of (1) 3–30% by weight, based on the total weight of monomers, of a monomer of the formula:

$$CH_2=CR_1-X-A$$

wherein $R_1$ is a member selected from the group consisting of hydrogen, alkyl having 1 to 5 carbon atoms, cyclohexyl, alkylcyclohexyl, phenyl, alkylphenyl, alkoxyphenyl, halophenyl, bromo and chloro, A is a monovalent organic radical containing at least one member selected from the group consisting of —$OSO_3H$, aliphatically bonded chlorine, and aliphatically bonded bromine, and X is a divalent organic radical selected from the group consisting of:

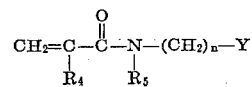

10. A composition useful for finishing fiber substrates, printing and dyeing purposes which comprises an aqueous emulsion of a polymer of a monomer of the formula:

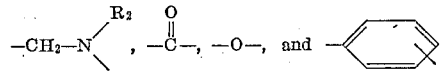

wherein $R_4$ is a member selected from the group consisting of hydrogen and methyl, Y is a member selected from the group consisting of the —$OSO_3H$ group, chloro and bromo, $n$ stands for a whole number of from 2 to 4 and $R_5$ is a member selected from the group consisting of hydrogen, alkyl having from 1 to 4 carbon atoms, and the group —$(CH_2)_n$—Y wherein Y and $n$ are as aforesaid.

References Cited by the Examiner

UNITED STATES PATENTS 2,807,597  9/1957  Sonnenfeld et al. ____ 260—29.6
3,067,161  12/1962  Roth _____ 260—29.6

LEON J. BERCOVITZ, *Primary Examiner.*

R. W. GRIFFIN, F. McKELVEY, *Assistant Examiners.*